US010901257B2

(12) United States Patent
Li et al.

(10) Patent No.: US 10,901,257 B2
(45) Date of Patent: Jan. 26, 2021

(54) DISPLAY PANEL AND DISPLAY DEVICE

(71) Applicant: Xiamen Tianma Micro-Electronics Co., Ltd., Xiamen (CN)

(72) Inventors: Donghua Li, Xiamen (CN); Xiaoli Wei, Xiamen (CN); Xiufeng Zhou, Xiamen (CN); Boping Shen, Xiamen (CN)

( * ) Notice: Subject to any disclaimer, the term of this patent is extended or adjusted under 35 U.S.C. 154(b) by 0 days.

(21) Appl. No.: 16/708,450

(22) Filed: Dec. 10, 2019

(65) Prior Publication Data

US 2020/0110298 A1 Apr. 9, 2020

(30) Foreign Application Priority Data

Mar. 26, 2019 (CN) .......................... 2019 1 0230990

(51) Int. Cl.

*G06F 3/041* (2006.01)
*G02F 1/1333* (2006.01)
*G02F 1/1339* (2006.01)
*G02F 1/1335* (2006.01)

(52) U.S. Cl.

CPC ...... *G02F 1/13338* (2013.01); *G02F 1/13394* (2013.01); *G02F 1/133514* (2013.01); *G06F 3/041* (2013.01)

(58) Field of Classification Search

CPC ............. G02F 1/13338; G02F 1/13394; G02F 1/133514; G02F 2201/56; G06F 3/041

See application file for complete search history.

(56) References Cited

U.S. PATENT DOCUMENTS

2009/0051636 A1* 2/2009 Natori .................. G09G 3/3648 345/87
2017/0235398 A1* 8/2017 Choi ..................... G06F 1/1688 345/173
2019/0235668 A1* 8/2019 Ye ....................... G06F 3/04164
2020/0110495 A1* 4/2020 Han ...................... G06F 3/0412

FOREIGN PATENT DOCUMENTS

CN 207636882 U 7/2018
CN 109061934 A 12/2018

* cited by examiner

*Primary Examiner* — Adam R. Giesy

(74) *Attorney, Agent, or Firm* — Kilpatrick Townsend & Stockton, LLP

(57) ABSTRACT

Disclosed are a display panel and a display device. In some embodiments of the disclosure, opening support structures are arranged between a first substrate and a second substrate in at least a sub-area corresponding to the largest one of respective first spacings, that is, the opening support structures are arranged in at least the sub-area in which connection segments of touch signal lines are the most sparsely arranged.

20 Claims, 13 Drawing Sheets

DISPLAY PANEL AND DISPLAY DEVICE

CROSS-REFERENCE TO RELATED APPLICATION

This application claims priority of Chinese Patent Application No. 201910230990.0, filed on Mar. 26, 2019, which is hereby incorporated by reference in its entirety.

FIELD

The present disclosure relates to the field of display technologies, and particularly to a display panel and a display device.

BACKGROUND

As the display technologies are advancing, display devices with a high screen to panel ratio, and a narrow bezel have emerged accordingly, and FIG. 1 illustrates a schematic structural diagram of a display panel in the related art, where a cam, and other elements with a large size are arranged in an opening area surrounded by a display area surrounded by a bezel area so that the area occupied by a bezel area can be narrowed to improve a screen to panel ratio, and design a display device with a narrow bezel.

SUMMARY

In one embodiments of the disclosure provide a display panel including: an opening area, a traveling line area surrounding the opening area, and a display area surrounding the traveling line area, and the display panel includes a first substrate and a second substrate, touch signal lines are arranged in a first direction on a side of the first substrate facing the second substrate, and at least a part of the touch signal lines include connection segments located in the traveling line area and the display panel includes opening support structures located between the first substrate and the second substrate, and the opening support structures are at least located in a sub-area corresponding to a largest one of first spacings, and the traveling line area includes sub-areas, and each of the first spacing is a largest one of spacings between every two adjacent connection segments in a sub-area in the first direction, and different first spacings correspond to different sub-areas.

In another embodiment of the disclosure provide a display device including the display panel above according to the embodiment of the disclosure.

DETAILED DESCRIPTION OF THE EMBODIMENTS

Figure 1:
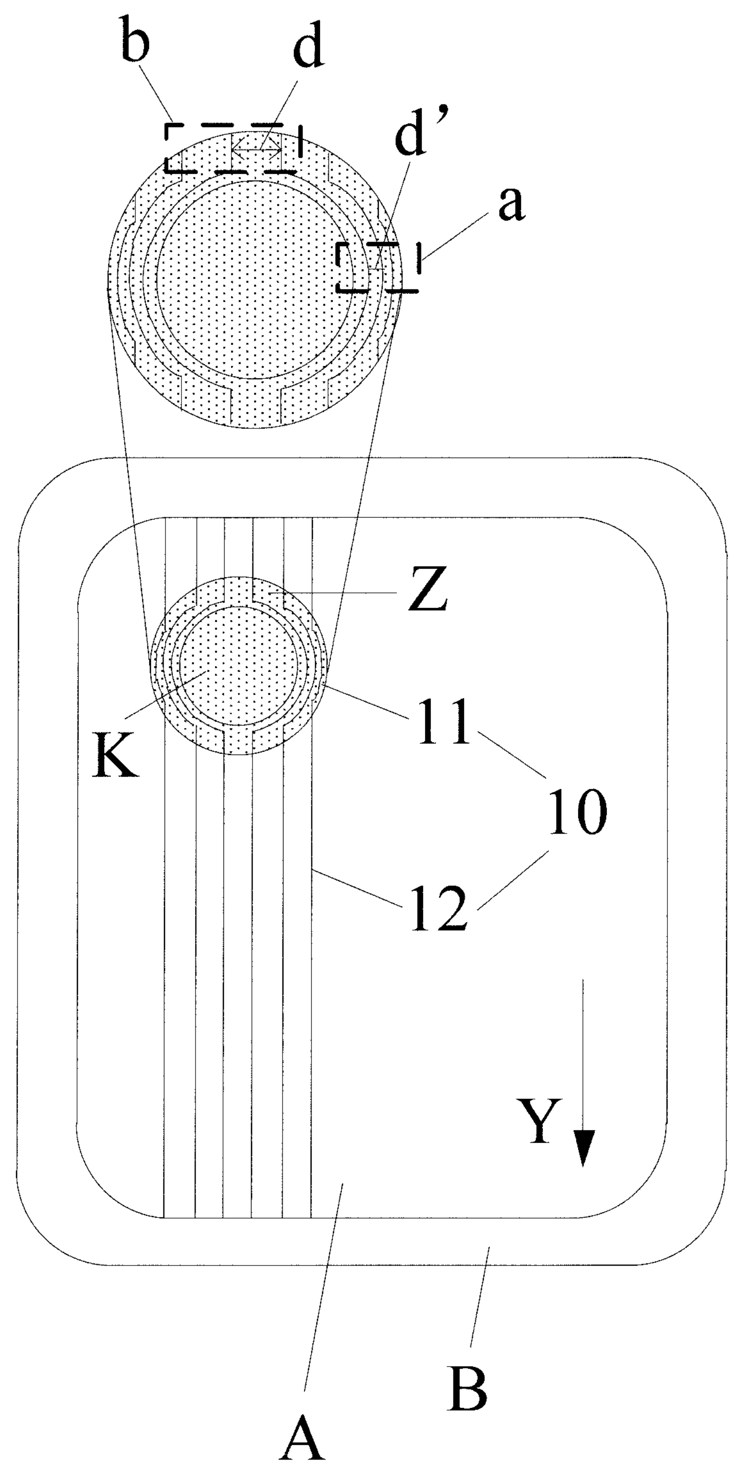
FIG. 1 is a schematic structural diagram of the display panel in the related art.

The inventors have identified during their study that the display panel as illustrated in FIG. 1 includes: an opening area K, a traveling line area Z surrounding the opening area K, a display area A surrounding the traveling line area Z, and a bezel area B surrounding the display area A, where the shape of the opening area K can be a circle as illustrated in FIG. 1, or another shape, and the shape of the opening area K will be a circle hereinafter by way of an example. Furthermore the display panel includes an array substrate and an opposite substrate arranged opposite to each other, the array substrate includes touch signal lines 10 on the side thereof facing the opposite substrate, and at least a part of the touch signal lines 10 run through the traveling line area Z, that is, each of the touch signal lines 10 running through the traveling line area Z includes a connection segment 11 located in the traveling line area Z, and normal segments 12 located in the display area A, where the normal segments 12 extend in the column direction (i.e., the Y direction in FIG. 1), and the connection segment 11 is configured to connect the normal segments 12 located on two sides of the opening area K.

The connection segment 11 is located in the traveling line area Z, and at least extends at the edge of the opening area K, so when the largest spacing between the respective connection segments 11 in each of the dotted boxes a and b (the largest spacing refer to the largest one of the spacings between the respective connection segments 11 in the arrangement direction of the touch signal lines 10) is referred to as a first spacing, the first spacing in the dotted box a (e.g., d') is smaller than the first spacing in the dotted box b (e.g., d), and thus the respective connection segments 11 in the traveling line area Z appear elliptic as a whole, that is, the opening area K visually appears elliptic instead of the real circle of the opening area K, thus degrading the visual uniformity of the opening area K, and improving the display effect of the display panel.

In view of this, some embodiments of the disclosure provides a display device to improve the display effect of the display panel including an opening area K.

Figure 2:
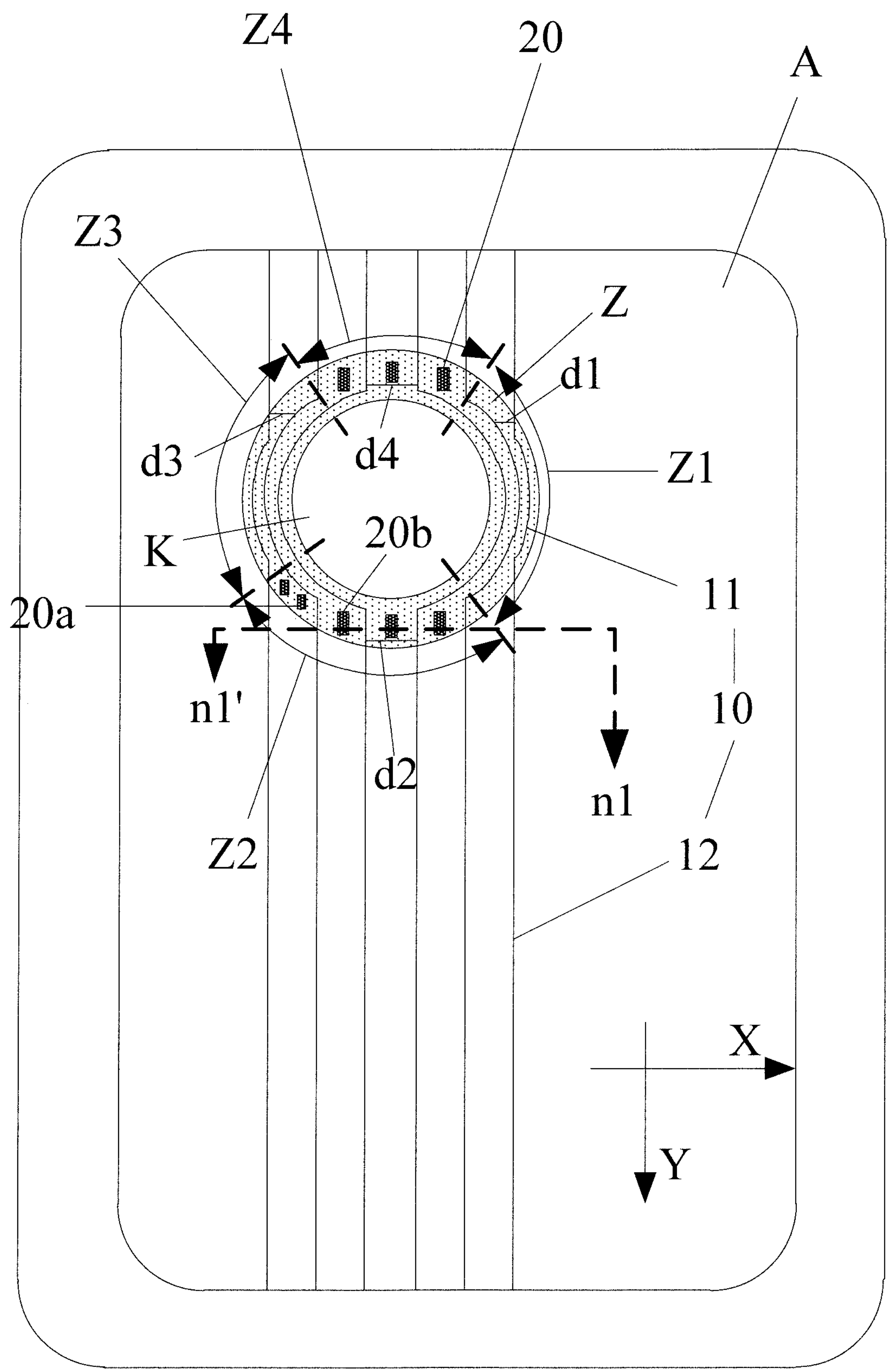
FIG. 2 is a schematic structural diagram of a display panel according to some embodiments of the disclosure.
Figure 3:
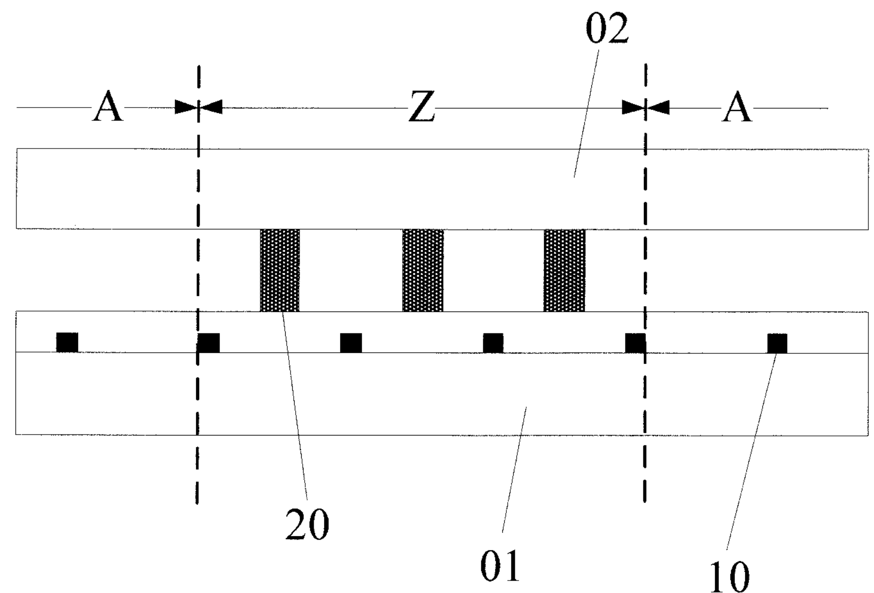
FIG. 3 is a sectional view of the display panel according to some embodiments of the disclosure along n1-n1' in FIG. 2.

FIG. 2 illustrates a schematic structural diagram of a display panel according to some embodiments of the disclosure, and FIG. 3 is a sectional view of the display panel according to the embodiment of the disclosure along n1-n1' in FIG. 2.

As illustrated in FIG. 2 and FIG. 3, the display panel can include: an opening area K, a traveling line area Z surrounding the opening area K, and a display area A surrounding the traveling line area Z; and as illustrated in FIG. 2, the shape of the opening area K can be a circle or another shape, although embodiments of the disclosure will not be limited thereto.

The display panel includes a first substrate 01 and a second substrate 02, touch signal lines 10 are arranged in a first direction on the side of the first substrate 01 facing the second substrate 02, and at least a part of the touch signal lines 10 include connection segments 1 located in the traveling line area Z, and can further include normal segments 12 located in the display area A.

Here the first direction can be the X direction, and at this time, the extension direction of the normal segments 12 can be the Y direction, as illustrated in FIG. 2; or the first direction can be the Y direction, and at this time, the extension direction of the normal segments 12 can be the X direction; or the first direction can be another direction than the X and Y directions, and at this time, the extension direction of the normal segments 12 can also be another direction than the X and Y directions, which is perpendicular to the arrangement direction of the touch signal lines, although the embodiment of the disclosure will not be limited thereto. In one embodiment, the touch signal lines 10 will extend in the Y direction, and the first direction will be the X direction hereinafter.

As illustrated in FIG. 2 and FIG. 3, the display panel can include opening support structures 20 located between the first substrate 01 and the second substrate 02, and the opening support structures 20 are at least located in a sub-area corresponding to the largest one of respective first spacings (e.g., d1, d2, d3, d4 as illustrated in FIG. 2), where the traveling line area Z includes sub-areas (e.g., Z1, Z2, Z3, Z4), and each first spacing is the largest one of the spacings between every two adjacent connection segments 1 in a sub-area in the first direction, and different first spacings correspond to different sub-areas.

As illustrated in FIG. 2, the traveling line area Z includes four sub-areas denoted respectively as Z1 to Z4, and first spacings corresponding to the four sub-areas are denoted respectively as d1 to d4, where the first spacing is the largest one of the spacings between the respective adjacent connection segments 11 in the sub-area in the first direction. If d2=d4, d2>d1, and d2>d3, which indicates that d2 and d4 are equal and the largest one of the four first spacings, then the opening support structures 20 may be arranged in at least the two sub-areas Z2 and Z4 corresponding to d2 and d4, or the opening support structures 20 may be arranged in only the two sub-areas Z2 and Z4 corresponding to d2 and d4 as illustrated in FIG. 2.

Stated otherwise, the opening support structures 20 are arranged between the first substrate 01 and the second substrate 02 in at least the sub-area corresponding to the largest one of the respective first spacings, that is, the opening support structures 20 are arranged in at least the sub-area in which the connection segments 11 of the touch signal lines 10 are the most sparsely arranged, so that the opening area K can visually appear in shape more approximate to the real shape of the opening area K to improve the visual uniformity of the opening area K to improve the display effect of the display panel.

Figure 4:
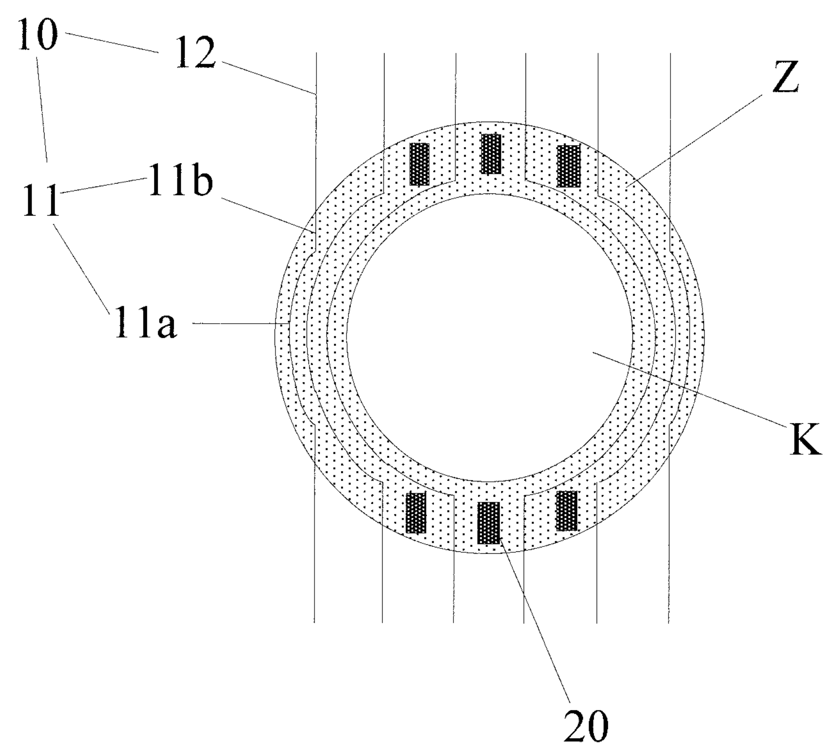
FIG. 4 is a schematic diagram of a part of a traveling line area in FIG. 2.

Optionally, in some embodiments of the disclosure, FIG. 4 illustrates a schematic diagram of a part of the traveling line area Z in FIG. 2, where each connection segment 11 can include a first segment 11*a* and second segments 11*b*, the first segment 11*a* can be arranged to extend at the edge of the opening area K, the second segments 11*b* can be arranged parallel to the normal segments 12, and the first segment 11*a* is configured to connect the two second segments 11*b* which are further connected respectively with the two normal segments 12. In this way, the touch signal line 10 can be avoided from being broken in the traveling line area Z so that a touch signal can be transmitted normally to perform a touch function.

In a particular implementation, the shape of an orthographic projection of the first segment 11*a* onto the second substrate 02 can be an arc as illustrated in FIG. 4, or a step, or another shape arranged to extend at the edge of the opening area K, although the embodiment of the disclosure will not be limited thereto. Furthermore the particular arrangement of the connection segment 11 will not be limited to the arrangement as illustrated in FIG. 4 only by way of an example, but can be any shape known, as long as the touch signal line can be avoided from being broken, although the embodiment of the disclosure will not be limited thereto.

Optionally, in some embodiments of the disclosure, since the opening support structures 20 and the connection segments 11 are arranged in the traveling line area Z, orthographic projections of the opening support structures 20 onto the second substrate 02 can be arranged not to overlap with the orthographic projections of the connection segments 11 onto the second substrate 02 (as illustrated in FIG. 3), that is, the opening support structures 20 are arranged to be spaced from the connection segments 11.

In this way, the thickness of the display panel can be avoided from being increased if the orthographic projections of the opening support structures 20 onto the second substrate 02 would otherwise have overlapped with the orthographic projections of the connection segments 11 onto the second substrate 02, thus fabricating the display panel in a thinned design, and improving the use experience of a user.

In a particular implementation, in the embodiment of the disclosure, opening support structures 20 may be arranged in the traveling line area Z, and when the opening support structures 20 are arranged in sub-areas, the opening support structures 20 can be distributed and arranged in the following several instances.

In a first instance, if the sub-area corresponding to the largest one of the respective first spacings is referred to as a first sub-area, then when the opening support structures 20 are arranged in at least a part of the sub-areas (including the first sub-area), and there is the same area of the orthographic projections of the respective opening support structures 20 onto the second substrate 02, the distribution densities of the opening support structures 20 will be positively correlated to the first spacings corresponding to the sub-areas where the opening support structures 20 are located.

Stated otherwise, when there is the same area of the orthographic projections of the respective opening support structures 20 onto the second substrate 02, if there is a larger first spacing corresponding to the sub-area where the opening support structures 20 are located, which indicates that the connection segments 11 are distributed more sparsely in the sub-area where the opening support structures 20 are located, then the opening support structures 20 may be arranged in a larger space, so the distribution density of the opening support structures 20 may be higher; or if there is a smaller first spacing corresponding to the sub-area where the opening support structures 20 are located, which indicates that the connection segments 11 are distributed more densely in the sub-area where the opening support structures 20 are located, then the opening support structures 20 may be arranged in a smaller space, so the distribution density of the opening support structures 20 may be lower.

Figure 5:
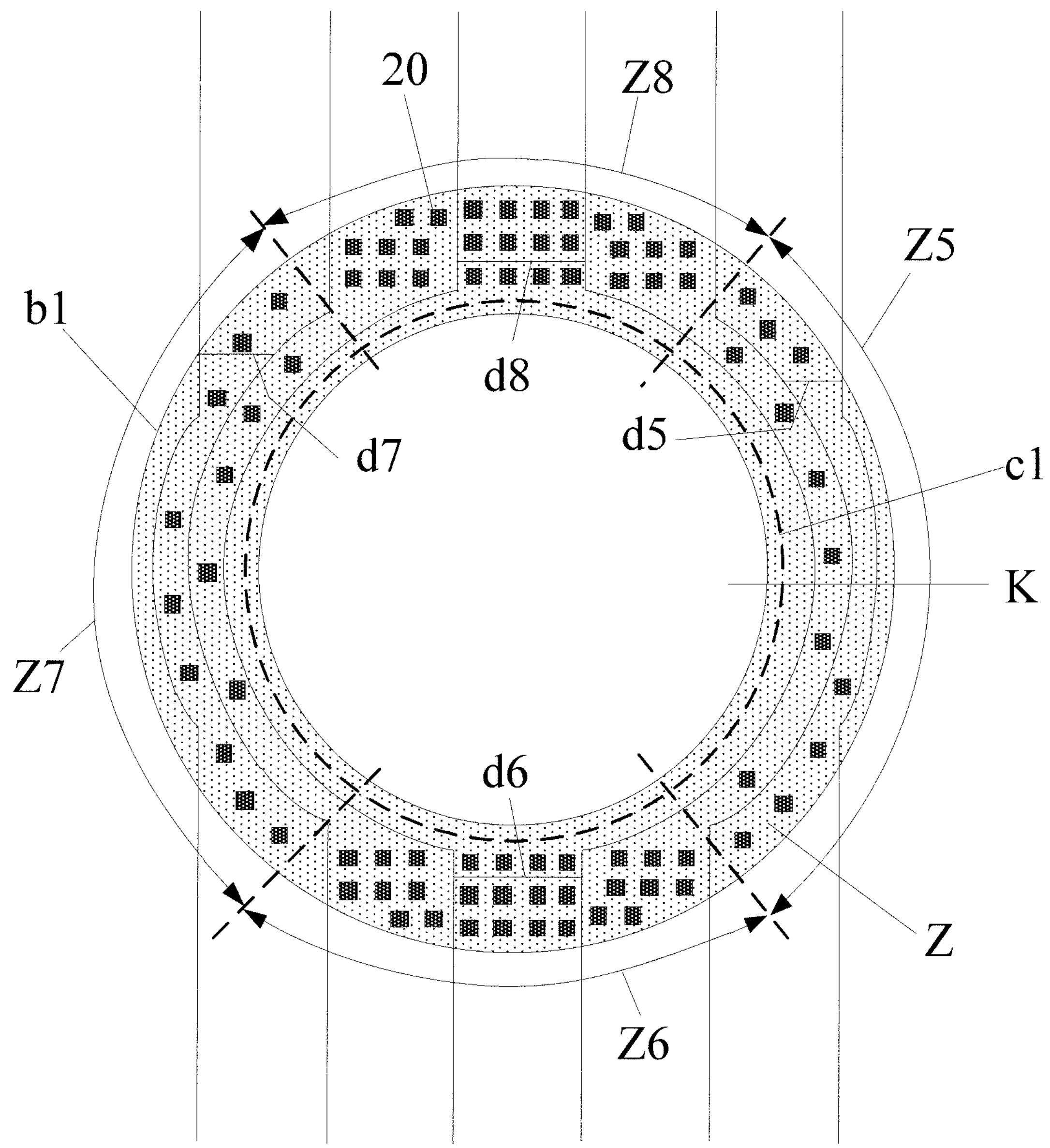
FIG. 5 is a schematic diagram of the distribution densities of opening support structures in respective sub-areas according to some embodiments of the disclosure.

As illustrated in FIG. 5 which is a schematic diagram of the distribution densities of the opening support structures in the respective sub-areas according to embodiments of the disclosure, for example, the traveling line area Z is divided into four sub-areas denoted respectively as Z5 to Z8, the first spacing corresponding to the sub-area Z5 is denoted as d5, the first spacing corresponding to the sub-area Z6 is denoted as d6, the first spacing corresponding to the sub-area Z7 is denoted as d7, and the first spacing corresponding to the sub-area Z8 is denoted as d8, where the opening support structures 20 are arranged in all of the four sub-areas, and since the first spacing d6 and the first spacing d8 are equal, the first spacing d6 is larger than the first spacing d5, and the first spacing d6 is larger than the first spacing d7, which indicates that the connection segments 11 are distributed more sparsely in the sub-area Z6 and the sub-area Z8, there is a larger space remaining for arranging the opening support structures 20, and at this time, both the sub-area Z6 and the sub-area Z8 can be referred to as a first sub-area, so the distribution densities of the opening support structures 20 in the sub-area Z6 and the sub-area Z8 are higher than the distribution densities of the opening support structures 20 in the sub-area Z5 and the sub-area Z7.

In this way, the sub-areas can be filled with the opening support structures 20 to make the structures surrounding the opening area K uniform to improve the visual uniformity of the opening area K, and thus the display effect of the display panel. Furthermore there is the same area of the orthographic projections of the respective opening support structures 20 onto the second substrate 02, so the difficulty of forming a mask can be lowered to lower the difficulty of fabricating the display panel.

Optionally, in some embodiments of the disclosure, when there is the same area of the orthographic projections of the respective opening support structures 20 onto the second substrate 02, if there is the same first spacing corresponding to sub-areas, then the opening support structures 20 may be distributed at the same density in these different sub-areas.

As illustrated in FIG. 5, for example, the first spacing d6 and the first spacing d8 are equal, and the first spacing d5 and the first spacing d7 are equal, so the opening support structures 20 are distributed at the same density in the sub-area Z6 and the sub-area Z8, and the opening support structures 20 are distributed at the same density in the sub-area Z5 and the sub-area Z7.

In this way, the structures surrounding the opening area K can be made uniform to improve the visual uniformity of the opening area K to improve the display effect of the display panel. Also the complexity of arranging the opening support structures 20 can be lowered to lower the difficulty of fabricating the display panel.

Optionally, there may be the same shape of the orthographic projections of the opening support structures 20 onto the second substrate 02, and the shape of the orthographic projections can be a square as illustrated in FIG. 5, or can be a circle, a polygon, or another shape, dependent upon a remaining space in the traveling line area Z to improve the flexibility of designing the opening support structures 20, although embodiments of the disclosure will not be limited thereto.

Optionally, in some embodiments of the disclosure, there are no opening support structures 20 in gaps between the connection segments 11, and the edge of the opening area K, and as illustrated in FIG. 5, no opening support structures 20 are arranged in a gap between the dotted ring c1, and the edge of the opening area K, that is, the opening support structures 20 are arranged between the respective connection segments 11, or between the interface between the traveling line area Z and the display area A (as denoted as b1 in FIG. 5), and the connection sections 11. In this way, the visual uniformity of the opening area K can be avoided from being degraded, to further improve the visual uniformity of the opening area K to improve the display effect of the display panel. Furthermore the number of opening support structures 20 to be arranged can also be reduced to facilitate a lower cost of fabricating the display panel.

In a second instance, when the opening support structures 20 are arranged in at least a part of the sub-areas (including the first sub-area), the areas of the orthographic projections of the opening support structures 20 onto the second substrate 02 are positively correlated to the first spacings corresponding to the sub-areas where the opening support structures 20 are located.

Stated otherwise, if there is a larger first spacing corresponding to the sub-area where the opening support structures 20 are located, which indicates that the connection segments 11 are distributed more sparsely in the sub-area where the opening support structures 20 are located, then the opening support structures 20 may be arranged in a larger space, so the areas of the orthographic projections of the opening support structures 20 onto the second substrate 02 may be larger; or if there is a smaller first spacing corresponding to the sub-area where the opening support structures 20 are located, which indicates that the connection segments 11 are distributed more densely in the sub-area where the opening support structures 20 are located, then the opening support structures 20 may be arranged in a smaller space, so the areas of the orthographic projections of the opening support structures 20 onto the second substrate 02 may be smaller.

Figure 6:
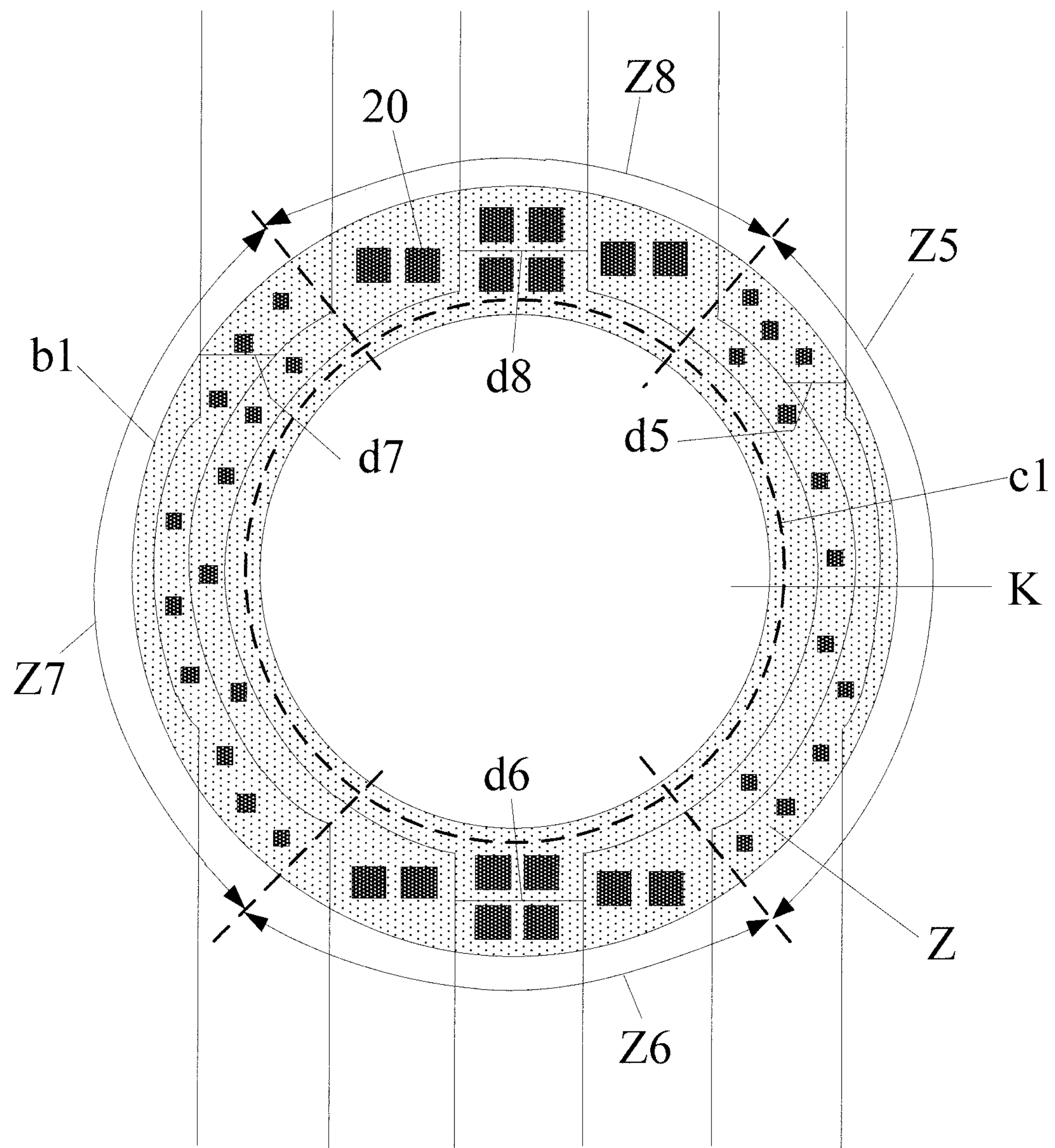
FIG. 6 is a schematic diagram of the areas of orthographic projections of the opening support structures in the respective sub-areas according to some embodiments of the disclosure onto a second substrate.

As illustrated in FIG. 6 which is a schematic diagram of the areas of the orthographic projections of the opening support structures in the respective sub-areas onto the second substrate according to the embodiment of the disclosure, for example, the traveling line area Z is divided into four sub-areas denoted respectively as Z5 to Z8, the first spacing corresponding to the sub-area Z5 is denoted as d5, the first spacing corresponding to the sub-area Z6 is denoted as d6, the first spacing corresponding to the sub-area Z7 is denoted as d7, and the first spacing corresponding to the sub-area Z8 is denoted as d8, where the opening support structures 20 are arranged in all of the four sub-areas, and since the first spacing d6 and the first spacing d8 are equal, the first spacing d6 is larger than the first spacing d5, and the first spacing d6 is larger than the first spacing d7, which indicates that the connection segments 11 are distributed more sparsely in the sub-area Z6 and the sub-area Z8, there is a larger space remaining for arranging the opening support structures 20, and at this time, both the sub-area Z6 and the sub-area Z6 can be referred to as first sub-areas, so the areas of the orthographic projections of the opening support structures 20 in the sub-area Z6 and the sub-area Z8 onto the second substrate 02 may be larger than the areas of the orthographic projections of the opening support structures 20 in the sub-area Z5 and the sub-area Z7 onto the second substrate.

In this way, the sub-areas can be filled with the opening support structures 20 to make the structures surrounding the opening area K uniform to improve the visual uniformity of the opening area K, and thus the display effect of the display panel. Furthermore the areas of the orthographic projections of the opening support structures 20 onto the second substrate 02 are positively correlated to the first spacings corresponding to the sub-areas where the opening support structures 20 are located, so when there is a larger remaining space in some sub-area, the opening support structures 20 can be formed with a larger size to lower the difficulty of forming the opening support structures 20 to lower the difficulty of fabricating the display panel.

Optionally, in some embodiments of the disclosure, if there is the same first spacing corresponding to sub-areas, then there may be the same area of the orthographic projections of the opening support structures 20 in these different sub-areas onto the second substrate 02.

As illustrated in FIG. 6, for example, the first spacing d6 and the first spacing d8 are equal, and the first spacing d5 and the first spacing d7 are equal, so there are the same area of the orthographic projections of the opening support structures 20 in the sub-area Z6 and the sub-area Z8 onto the second substrate 02, and the same area of the orthographic projections of the opening support structures 20 in the sub-area Z5 and the sub-area Z7 onto the second substrate 02.

In this way, the structures surrounding the opening area K can be made uniform to improve the visual uniformity of the opening area K to improve the display effect of the display panel. Also the complexity of arranging the opening support structures 20 can be lowered to lower the difficulty of fabricating the display panel.

Optionally, there may be the same area of the orthographic projections of the respective opening support structures 20 in the same sub-area onto the second substrate 02. As illustrated in FIG. 6, for example, eight opening support structures 20 are arranged in the sub-area Z8, and there is the same area of the orthographic projections of these opening support structures 20 onto the second substrate 02. In this way, the difficulty of forming a mask for forming the opening support structures 20 can be lowered to lower the difficulty of fabricating the display panel.

Of course, in some embodiments of the disclosure, there may be different areas of the orthographic projections of the respective opening support structures 20 in the same sub-area onto the second substrate 02; and as illustrated in FIG. 2, in the sub-area Z2, there are different areas of the orthographic projections of the opening support structures 20 denoted as 20*a* and 20*b* onto the second substrate 02, where the area of the orthographic projection of the opening support structure 20 denoted as 20*a* onto the second substrate 02 is smaller than the area of the orthographic projection of the opening support structure 20 denoted as 20*b* onto the second substrate 02. In this way, the opening support structures 20 can be arranged according to distribution conditions of the remaining spaces in the sub-areas to improve the flexibility of designing the opening support structure 20.

Optionally, in some embodiments of the disclosure, there are no opening support structures 20 in gaps between the connection segments 11, and the edge of the opening area K, and as illustrated in FIG. 6, no opening support structures 20 are arranged in a gap between the dotted ring c1, and the edge of the opening area K, that is, the opening support structures 20 are arranged between the respective connection segments 11, or between the interface between the traveling line area Z and the display area A (as denoted as b1 in FIG. 6), and the connection sections 11. In this way, the visual uniformity of the opening area K can be avoided from being degraded, to further improve the visual uniformity of the opening area K to improve the display effect of the display panel. Furthermore the number of opening support structures 20 to be arranged can also be reduced to facilitate a lower cost of fabricating the display panel.

In a third instance, also when there is the same area of the orthographic projections of the opening support structures 20 onto the second substrate 02, if at least a part of the sub-areas (including the first sub-area) are connected with the opening area K, and the respective sub-areas connected with the opening area K are connected with each other to constitute a closed area, that is, there is such an interface between the closed area and the opening area K that is the boundary of the opening area, then the respective opening support structures 20 located in the closed area may be distributed uniformly at the edge of the opening area K.

Figure 7:
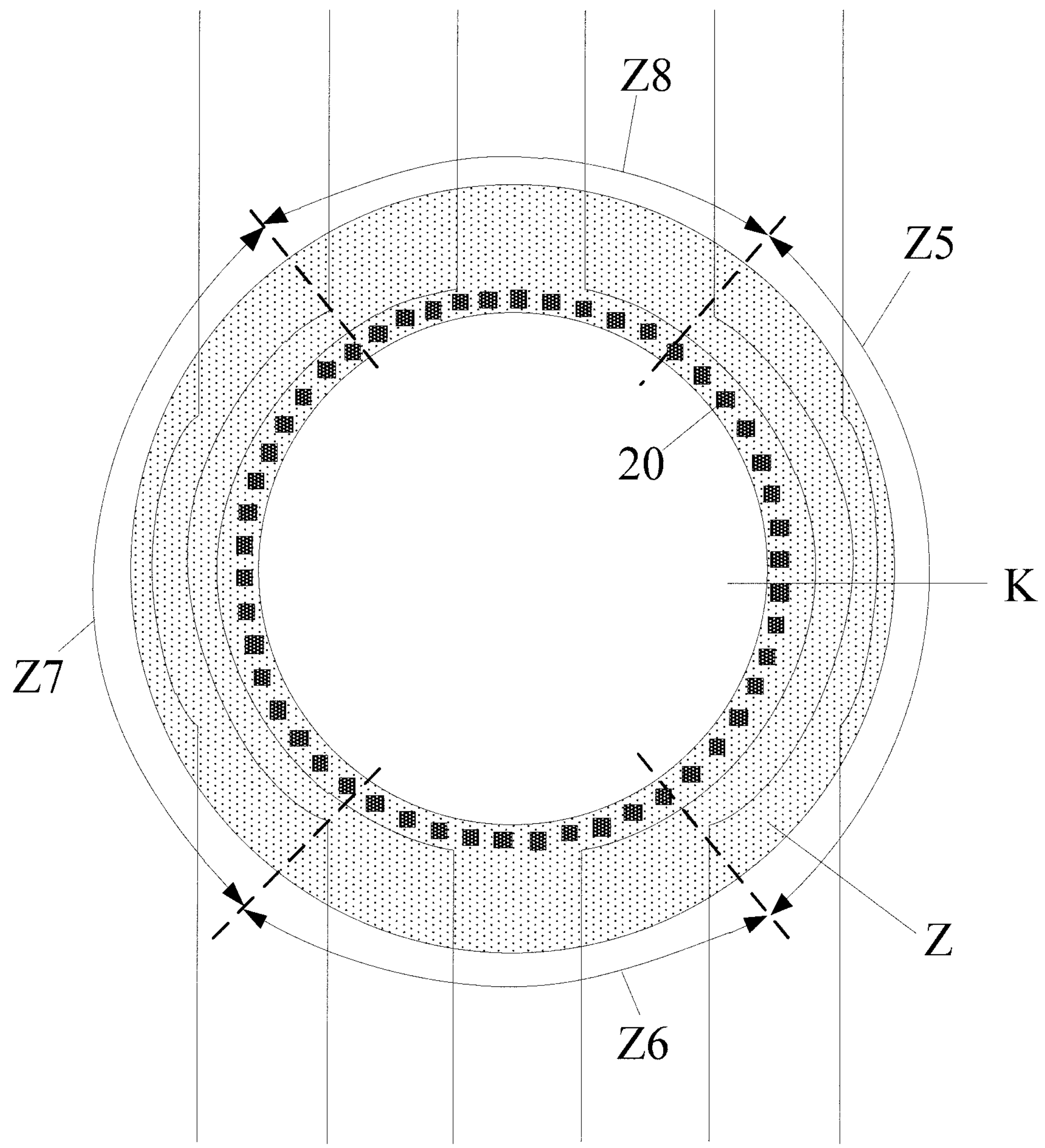
FIG. 7 is a schematic diagram of the respective opening support structures arranged at the edge of an opening area according to some embodiments of the disclosure.

As illustrated in FIG. 7 which is a schematic diagram of the respective opening support structures arranged at the edge of the opening area according to the embodiment of the disclosure, for example, the traveling area Z is divided into four sub-areas denoted respectively as Z5 to Z8, and all of these four sub-areas are connected with the opening area K, and also connected with each other, so these four sub-areas are connected with each other to constitute a closed area, i.e., the traveling line area Z, that is, the opening support structures 20 are arranged in each sub-area, and at this time, the respective opening support structures 20 can be distributed uniformly at the edge of the opening area K.

Figure 8:
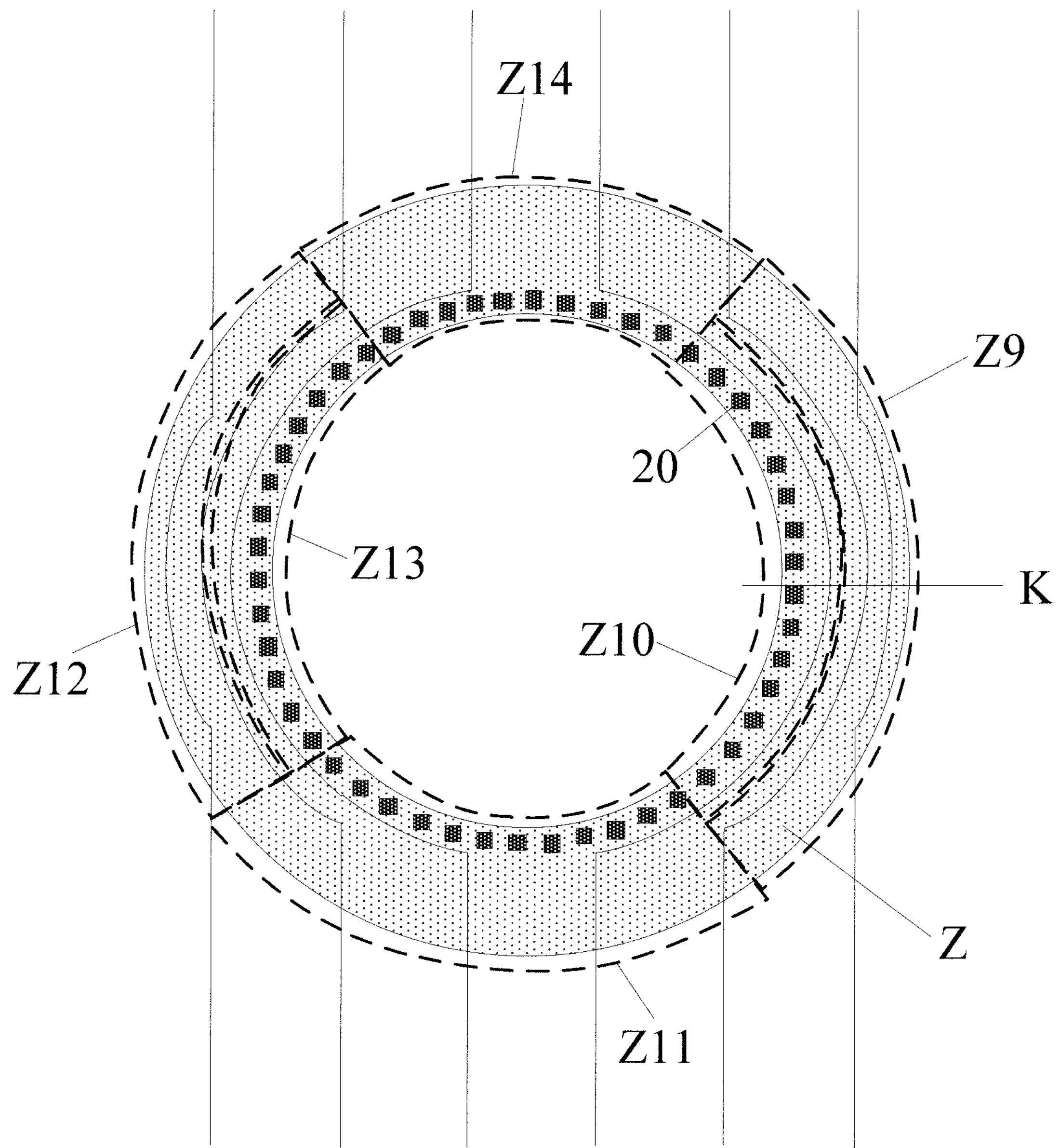
FIG. 8 is a schematic diagram of the respective opening support structures arranged at the edge of the opening area when the traveling line area is divided into the different sub-areas according to some embodiments of the disclosure.

As illustrated in FIG. 8 which is a schematic diagram of the respective opening support structures arranged at the edge of the opening area when the traveling line area is divided into the different sub-areas according to the embodiment of the disclosure, for example, the traveling area Z is divided into six sub-areas denoted respectively as Z9 to Z14, where only four sub-areas, i.e., the sub-area Z10, the sub-area Z11, the sub-area Z13, and the sub-area Z14, are connected with the opening area K, and the sub-area Z9 and the sub-area Z12 are not connected with the opening area K; and the sub-area Z10, the sub-area Z11, the sub-area Z13, and the sub-area Z14 connected with the opening area K constitute a closed area, and although this closed area is not an area in a regular shape, there is such an interface between the closed area and the opening area K that is the boundary of the opening area K, so the respective opening support structures 20 in the closed area can be distributed uniformly at the edge of the opening area K, that is, the respective opening support structures in the sub-area Z10, the sub-area Z11, the sub-area Z13, and the sub-area Z14 can be distributed uniformly at the edge of the opening area K.

In this way, the opening support structures 20 are circled around the opening area K, at the edge of the opening area K, so that the circled opening support structures 20 can improve in effect the visual uniformity of the opening area K to improve the display effect of the display panel.

Furthermore there is the same area of the orthographic projections of the respective opening support structures 20 onto the second substrate 02 as illustrated in FIG. 7 and FIG. 8, so the difficulty of forming a mask for forming the opening support structures 20 can be lowered to lower the difficulty of fabricating the display panel.

Figure 9:
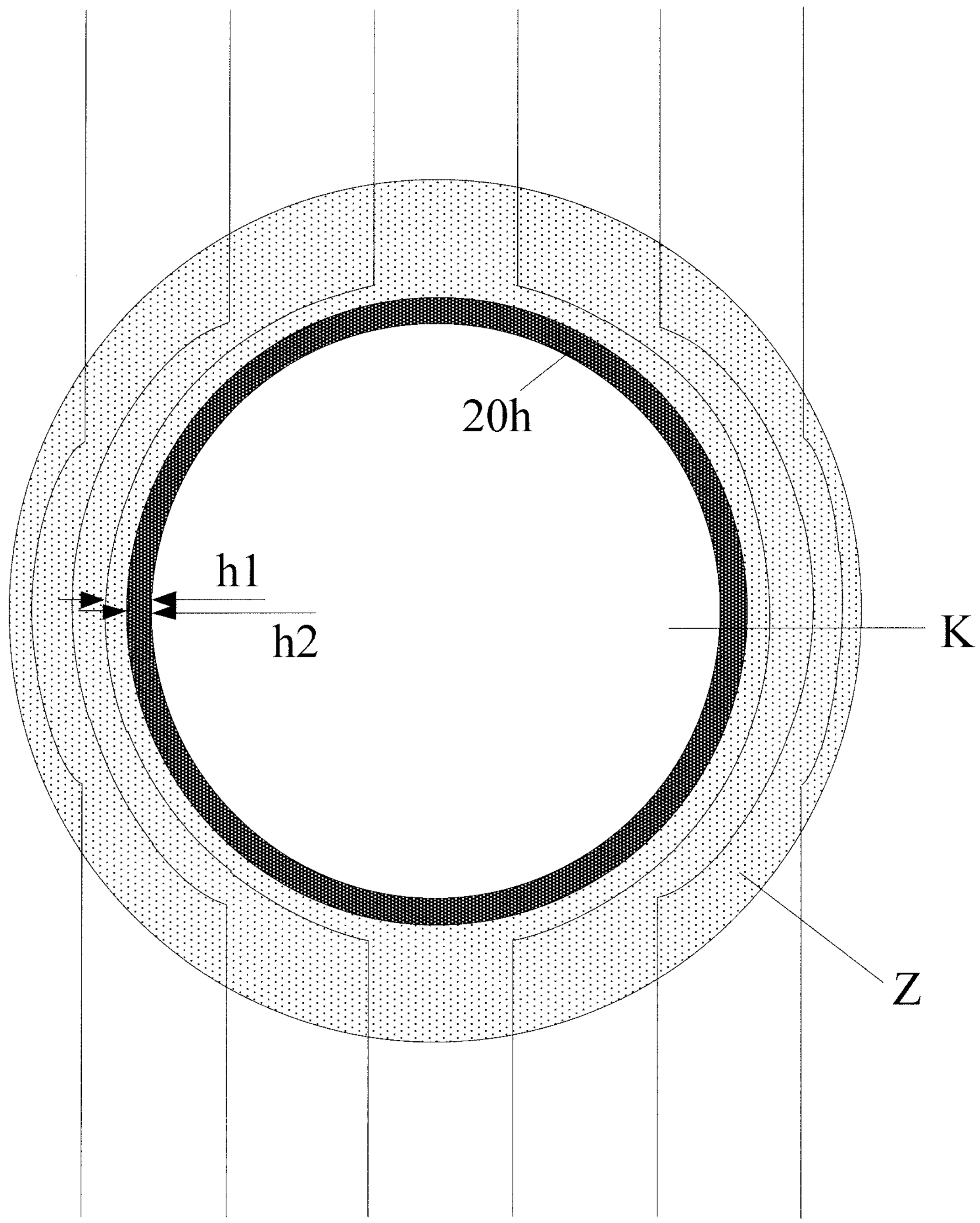
FIG. 9 is a schematic structural diagram of the respective opening support structures constituting an annular structure surrounding the opening area according to some embodiments of the disclosure.

Optionally, in order to simplify a fabrication process, in the embodiment of the disclosure, the respective opening support structures 20 are connected with each other to constitute an annular structure 20*h* surrounding the opening area K as illustrated in FIG. 9 which is a schematic structural diagram of the respective opening support structures constituting an annular structure 20*h* surrounding the opening area according to the embodiment of the disclosure. At this time, it can be appreciated that the annular structure 20*h* surrounding the opening area K is arranged proximate to the edge of the opening area K to further make the opening area K appear in a circle shape to further improve the visual uniformity of the opening area K, and thus the display effect of the display panel.

It shall be noted that in order to avoid the thickness of the display panel from being increased, the orthographic projections of the opening support structures 20 onto the second substrate 02 do not overlap with the orthographic projections of the connection segments 11 onto the second substrate 02, so in some embodiments of the disclosure, the width of the annular structure 20*h* can be set smaller than or equal to a first width, where the first width can be the shortest distance between such one of the connection segments 11 that is the closest to the opening area K, and the edge of the opening area K, and as illustrated in FIG. 9, h1 represents the first width, and h2 represents the width of the annular structure 20*h*, where h2<h1. In this way, the orthographic projection of the annular structure 20*h* onto the second substrate 02 does not overlap with the orthographic projections of the connection segments 11 onto the second substrate 02 so that the orthographic projections of the opening support structures 20 onto the second substrate 02 do not overlap with the orthographic projections of the connection segments 11 onto the second substrate 02 to avoid the thickness of the display panel from being increased, to facilitate a thinned design of the display panel.

Figure 10:
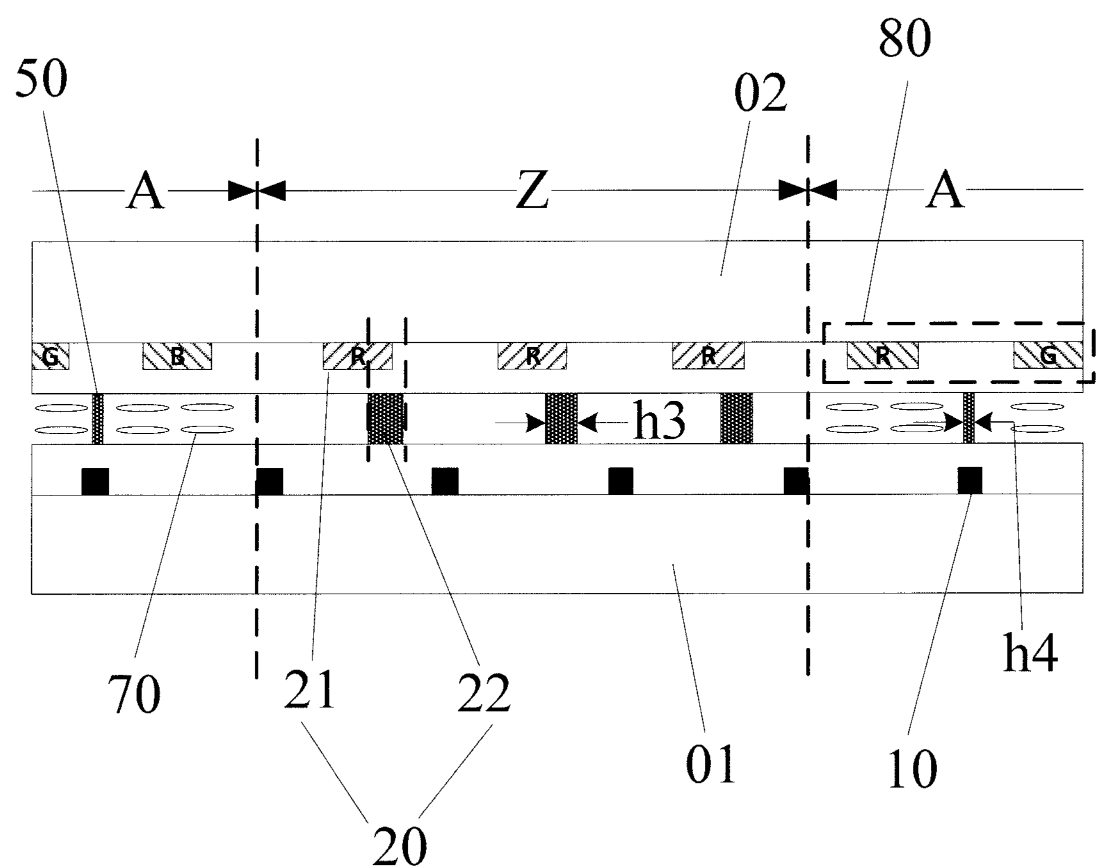
FIG. 10 is another sectional view of the display panel according to some embodiments of the disclosure along n1-n1' in FIG. 2.
Figure 12:
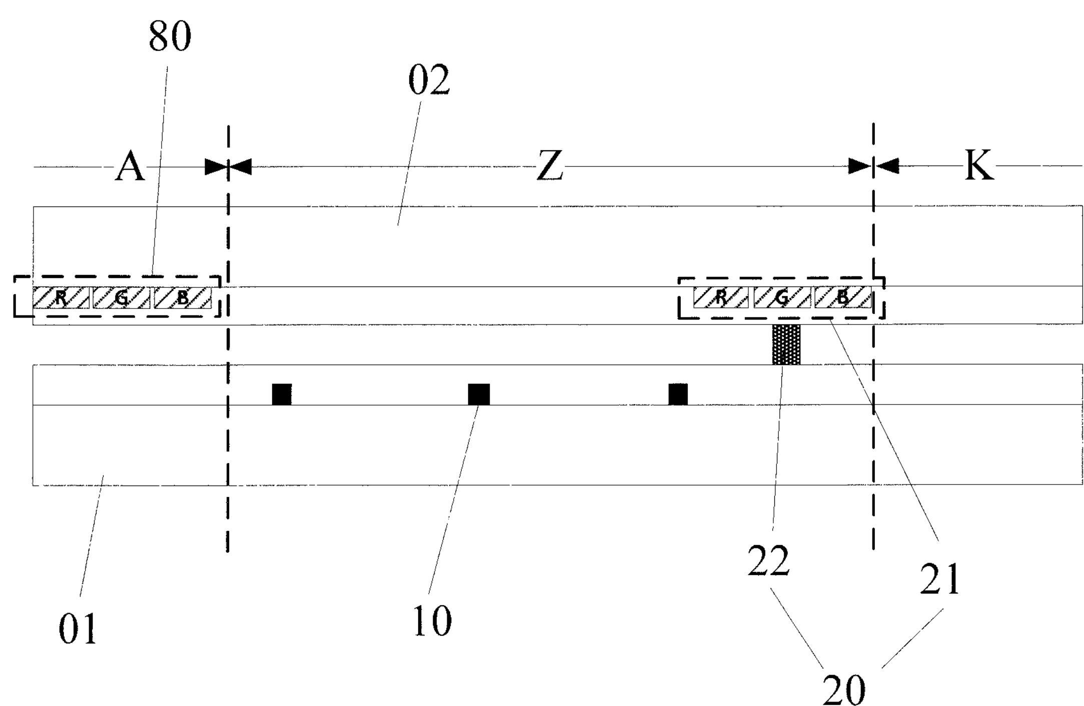
FIG. 12 is a sectional view of the display panel according to some embodiments of the disclosure along n2-n2' in FIG. 7.

In a particular implementation, in order to form the opening support structures 20, in the embodiment of the disclosure, as illustrated in FIG. 10 which is another sectional view of the display panel according to the embodiment of the disclosure along n1-n1' in FIG. 2, and FIG. 12 which is a sectional view of the display panel according to the embodiment of the disclosure along n2-n2' in FIG. 7, each opening support structure 20 can include a layer structure 21 and a support structure 22 arranged in a stack, where an orthographic projection of the support structure 22 onto the second substrate 02 at least partially overlaps with an orthographic projection of the layer structure 21 onto the second substrate 02.

Stated otherwise, the orthographic projections of the support structures 22 onto the second substrate 02 can partially overlap with the orthographic projections of the layer structures 21 onto the second substrates 02 as illustrated in FIG. 10 so that the layer structures 21 can support the support substrates 22 to enable the support structures 22 to be arranged firmly between the first substrate 01 and the second substrate 02, to improve the structural stability of the display panel.

Alternatively the orthographic projections of the support structures 22 onto the second substrate 02 can completely overlap with the orthographic projections of the layer structures 21 onto the second substrates 02, that is, the orthographic projections of the support structures 22 onto the second substrate 02 fall into the orthographic projections of the layer structures 21 onto the second substrates 02, as illustrated in FIG. 12. In this way, the layer structures 21 can support in effect the support structures 22 to avoid the support structures 22 from being supported unstably and thus displaced, to avoid the other structures around the support structures 22 from being affected, thus improving in effect the structural stability of the display panel.

In order to perform a display function in the display panel, the display panel typically include an array substrate and an opposite substrate opposite to each other, where the first substrate 01 can be an underlying substrate in the array substrate, and the second substrate 02 can be an underlying substrate in the opposite substrate; or the second substrate 02 can be an underlying substrate in the array substrate, and the first substrate 01 can be an underlying substrate in the opposite substrate.

No matter whichever substrates include the first substrate 01 and the second substrate 02 respectively, the support structures 22 are arranged between the array substrate and the opposite substrate as illustrated in FIG. 10 and FIG. 12. When the display panel is a liquid crystal display panel, spacers configured to support the array substrate and the opposite substrate (represented as 50 in FIG. 10), and liquid crystals (represented as 70 in FIG. 10) are arranged in the liquid crystal display panel, where the liquid crystals 70 are arranged in the display area A, so the support structures 22 can be arranged between the array substrate and the opposite substrate to make full use the structure of and the space in the existing display panel not to increase the thickness of the display panel, thus facilitating a thinned design of the display panel.

Optionally, in some embodiment of the disclosure, both the shape and the material of the support structures 22 can be the same as those of the spacers 50, that is, both the support structures 22 and the spacers 50 can be formed in a patterning process to simplify the fabrication process of the display panel, and lower the difficulty of fabricating the display panel.

Here the shapes of the support structures 22 and the spacers 50 can be a cylinder (as shown in FIG. 10), but will not be limited thereto, or can be other shapes as long as the support structures have a support function, and the spacers have a spacing function. Furthermore the materials of the support structures 22 and the spacers 50 can be any material known, as long as the support structures have a support function, and the spacers have a spacing function, although the embodiment of the disclosure will not be limited thereto.

It shall be noted that in order to lower the difficulty of forming the support structures 22, the areas of the orthographic projections of the support structures 22 onto the second substrate 02 are larger than the areas of orthographic projections of the spacers 50 onto the second substrate 02, and as illustrated in FIG. 10, if both the shapes of the support structures 22 and the spacers 50 are a cylinder, then the orthographic projections of the support structures 22 onto the second substrate 02 will be a circle in shape, where h3 represents the diameter of the circle, and the orthographic projections of the spacers 50 onto the second substrate 02 will be a circle in shape, where h4 represents the diameter of the circle, where h3>h4. In this way, the difficulty of forming the support structures 22 can be lowered greatly to greatly lower the difficulty of fabricating the display panel. Of course, particular values of h3 and h4 can be set as needed for the real structure of the display panel, although the embodiment of the disclosure will not be limited thereto.

Furthermore in the liquid crystal display panel, the spacers 50 generally can include primary spacers and secondary spacers, and reference can be made to the related art for the arrangement and the material of the primary spacers and the secondary spacers, so a repeated description thereof will be omitted here. The spacers 50 as mentioned in the disclosure above of the embodiment of the disclosure can be regarded as primary spacers, that is, the shape and the material of the support structures 22 can be the same as those of the primary spacers, and the areas of the orthographic projections of the support structures 22 onto the second substrate 02 can be larger than the areas of the orthographic projections of the primary spacers onto the second substrate 02.

In some embodiments of the disclosure, the layer structures 21 can be arranged in the following patterns.

In a first pattern, the layer structures 21 can be located in the opposite substrate, and the opposite substrate can include color-resist blocks 80 arranged on the side thereof facing the array substrate; and at this time, the layer structures 21 can be arranged at the same layer as the color-resist blocks 80.

As illustrated in FIG. 10, for example, the first substrate 01 is an underlying substrate in the array substrate, and the second substrate 02 is an underlying substrate in the opposite substrate; and in order to display an image in color, there are generally the color-resist blocks 80 on the side of the opposite substrate facing the array substrate, and pixel elements (not illustrated) on the side of the array substrate facing the opposite substrate, where the color-resist blocks 80 are generally arranged corresponding to the pixel elements so that an image can be displayed in color. Stated otherwise, the color-resist blocks 80 are arranged above the side of the second substrate 02 facing the first substrate 01, and the touch signal lines 10 are arranged above the side of the first substrate 01 facing the second substrate 02. At this time, the layer structures 21 can be arranged using the color-resist blocks 80 in the opposite substrate, that is, the layer structures 21 can be arranged at the same layer as the color-resist blocks 80.

In this way, both the layer structures 21 and the color-resist blocks 80 can be formed in a patterning process to simplify the fabrication process of the display panel to lower the difficulty of fabricating the display panel.

Optionally, the color-resist blocks 80 generally can include red color-resist blocks (e.g., R), green color-resist blocks (e.g., G), and blue color-resist blocks (e.g., B), and of the color-resist blocks in the three colors, the brightness of light transmitted through the red color-resist blocks R is the lowest, the brightness of light transmitted through the blue color-resist blocks B is the second lowest, and the brightness of light transmitted through the green color-resist blocks G is the highest, so in the embodiment of the disclosure, the layer structures 21 can be formed of the same material as the red color-resist blocks R, and FIG. 10 illustrates the structure of only a part of the color-resist blocks 80. Of course, in some embodiments of the disclosure, the layer structures 21 can be formed of the same material as the blue color-resist blocks B.

It shall be noted that in a particular implementation, black matrixes are generally arranged between the color-resist blocks in the different colors to shield signal lines and other structures located between the color-resist blocks in the different colors not to affect the display effect, and the black matrixes are not illustrated in FIG. 10 for the sake of an illustration of a relative positional relationship between the layer structures 21, the color-resist blocks 80, and the support structures 22.

Since the connection segments 11 are made of a material which is typically an electrically conductive metal material with an extremely low transmittivity, the layer structures 21 can be made of the same material as the red color-resist blocks R or the blue color-resist blocks B to make the transmissivity of the support structures 22 more approximate to the transmittivity of the connection segments 11 to improve the visual uniformity of the opening area K, and thus the display effect of the display panel.

Figure 11:
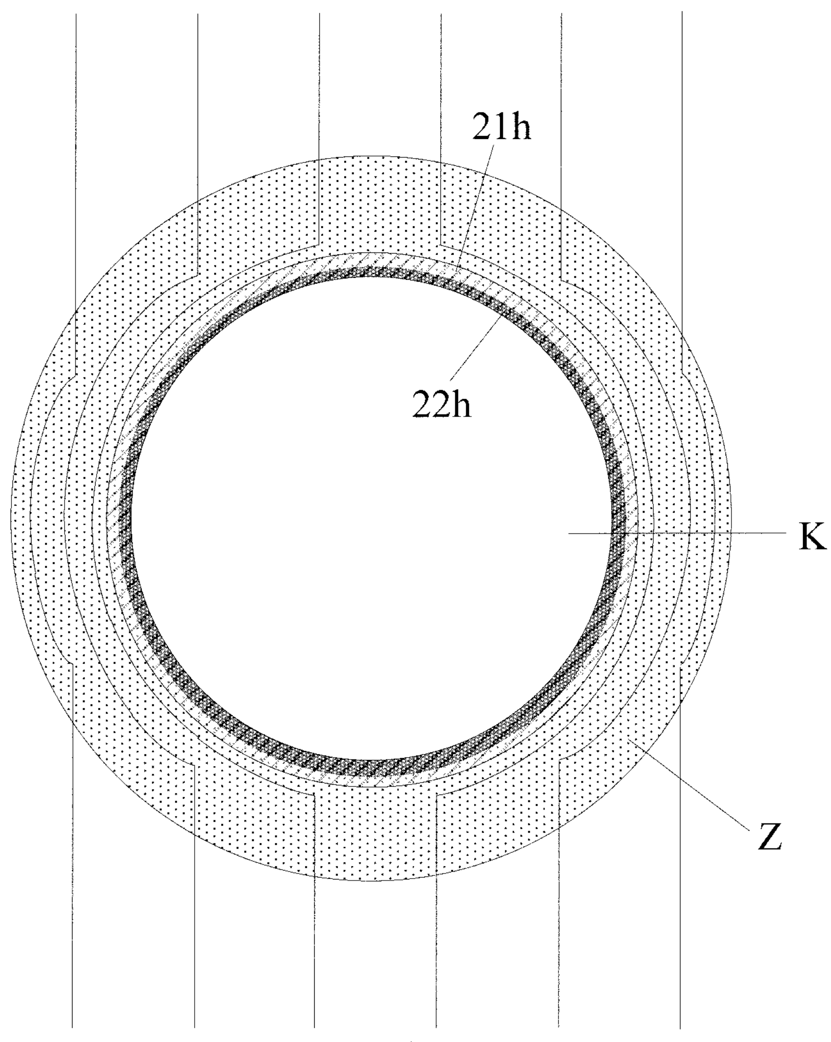
FIG. 11 is a schematic diagram of both layer structures and the support structures arranged as annular structures surrounding the opening area according to some embodiments of the disclosure.

It shall be noted that the layer structures 21 can be arranged at the edge of the opening area K in the traveling line area Z at the same layer as the color-resist blocks 80, that is, the layer structures 21 is an annular structure surrounding the opening area K (e.g., 21*h* in FIG. 11 which is a schematic diagram of both layer structures and the support structures arranged as annular structures surrounding the opening area according to the embodiment of the disclosure); and correspondingly the support structures 22 can also be arranged as an annular structure surrounding the opening area K (e.g., 22*h* in FIG. 11), and the two annular structures are arranged in a stack; or support structures can arranged uniformly around the edge of the opening area K, although the support structures are not illustrated. In this way, the difficulty of forming the layer structures 21 can be lowered to lower the difficulty of fabricating the display panel, but also the visual uniformity of the opening area K can be further improved to improve the display effect of the display panel.

In a second pattern, the layer structures 21 can also be located in the opposite substrate, and the layer structures 21 can also be arranged at the same layer as the color-resist blocks 80, but a difference from the first arrangement pattern lies in that when the color-resist blocks 80 include red color-resist blocks (e.g., R), green color-resist blocks (e.g., G), and blue color-resist blocks (e.g., B), the layer structures 21 can be of the same size as the color-resist blocks 80 as illustrated in FIG. 12.

Stated otherwise, the layer structures 21 are not made of the same material as color-resist blocks in any color among the color-resist blocks 80, but the layer structures 21 are made in the same size as the color-resist blocks 80, and include color-resist blocks R, green color-resist blocks G, and blue color-resist blocks B. Stated otherwise, a layer structure 21 is structured exactly the same as a color-resist block 80, that is, both the layer structure 21 and the color-resist block 80 include color-resist blocks R, green color-resist blocks G, and blue color-resist blocks B as illustrated in FIG. 12.

Of course, in a particular implementation, the size of a layer structure 21 will not be limited to the size of a color-resist block 80, but the size of a layer structure 21 may alternatively be the sum of the sizes of color-resist blocks 80 as long as the layer structure 21 can support the support structure 22, although the size of a layer structure 21 will not be limited to any particular size.

In this way, since the layer structures 21 located in the traveling line area are of the same size as the color-resist blocks 80 located in the display area, the layer structures 21 located in the traveling line area may not be sized separately to lower the complexity of a mask for forming the layer structures 21, to lower the difficulty of fabricating the display panel. Also since a layer structure 21 is of the same size as a color-resist block 80, the layer structure 21 can be sized larger to better support the support structures to improve the visual uniformity of the opening area K. In this way, the encapsulation thickness of the display panel can be made uniform to improve the quality of the display panel.

Optionally, in this arrangement pattern, the support structures 22 can be arranged as an annular structure at the edge of the opening area K, and at this time, an orthographic projection of the annular structure onto the second substrate 02 may overlap with the orthographic projections of the layer structures 21 onto the second substrate 02 at any position as long as the layer structures 21 can support the support structure 22 to improve the visual uniformity of the opening area K, and thus the display effect of the display panel.

Of course, the support structures 22 can alternatively be arranged as separate support structures 22 at the edge of the opening area K, and the orthographic projection of each support structure 22 onto the second substrate 02 overlaps with the orthographic projection of each layer structure 21 onto the second substrate 02. In this way, the difficulty of forming the support structures 22 can be lowered to lower the difficulty of fabricating the display panel.

Furthermore, the orthographic projection of each support structure 22 onto the second substrate 02 overlaps with the center of the orthographic projection of a green color-resist block in each layer structure 21 onto the second substrate 02 as illustrated in FIG. 12; or the orthographic projection of each support structure 22 onto the second substrate 02 overlaps with the center of the orthographic projection of a red color-resist block in each layer structure 21 onto the second substrate 02 (not illustrated); or the orthographic projection of each support structure 22 onto the second substrate 02 overlaps with the center of the orthographic projection of a blue color-resist block in each layer structure 21 onto the second substrate 02 (not illustrated). In this way, the layer structure 21 can support in effect the support structure 22 to further improve the visual uniformity of the opening area K, and thus the display effect of the display panel.

Figure 13:
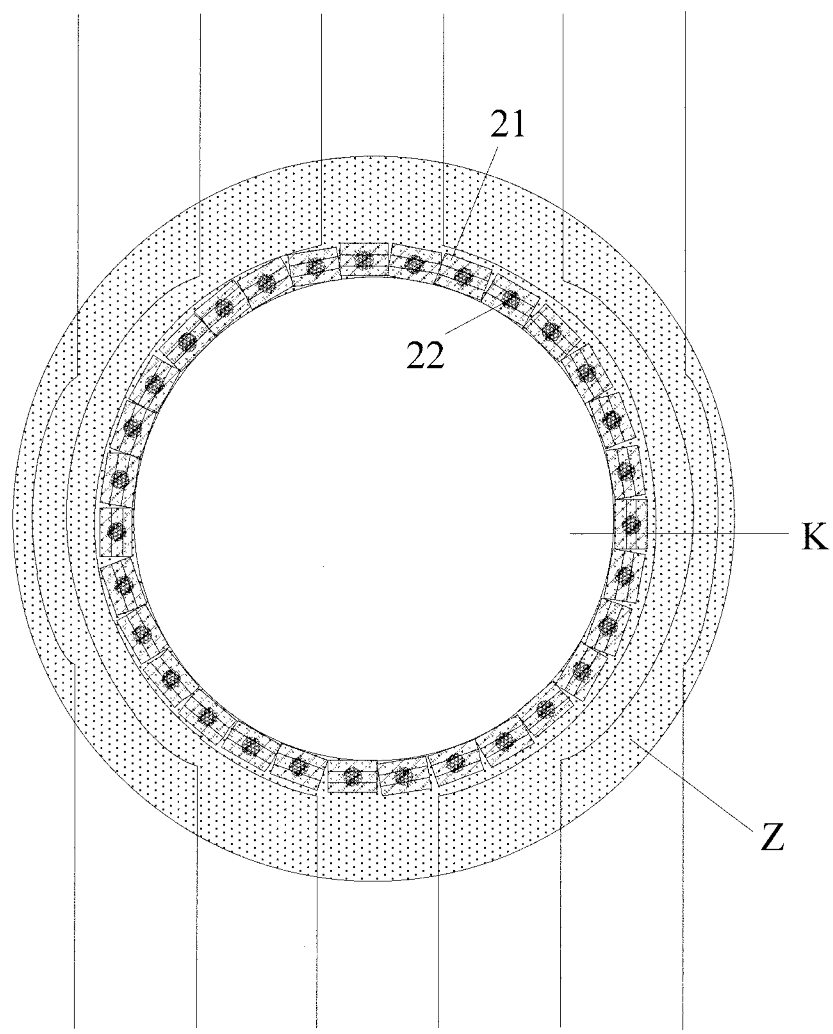
FIG. 13 is a schematic diagram of the layer structures in a round design when the layer structures are arranged at the same layer as color-resist blocks according to some embodiments of the disclosure.

In one embodiment, a layer structure 21 can be of the same size as a color-resist block 80, and the layer structure 21 can be arranged as follows: as illustrated in FIG. 13 which is a schematic diagram of the layer structures in a round design when the layer structures are arranged at the same layer as the color-resist blocks according to the embodiment of the disclosure, where only the layer structures 21, the support structures 22, the touch signal lines, the opening area K, and the traveling line area Z are illustrated, the respective layer structures 21 can be adjusted in position so that the respective layer structures 21 are designed in a round at the edge of the opening area K, and the respective layer structures 21 can be connected with each other; or the edges of two adjacent layer structures 21 may not overlap with each other without increasing the thickness of the display panel, to help the layer structures with surrounding the opening area K to better support the support structures 22, thus lowering the difficulty of fabricating the display panel, but also further improving the visual uniformity of the opening area K, and thus the display effect of the display panel.

Of course, the layer structures 21 can be arranged in another design than the round design so that the orthographic projections of the layer structures 21 onto the second substrate 02 are shaped exactly the same as the orthographic projections of the color-resist blocks 80 onto the second substrate 02. In this way, the difficulty of forming the layer structures 21 can be lowered to lower the difficulty of fabricating the display panel.

In a third pattern, the layer structures 21 can be located in the array substrate, and there are generally layers on the side of the array substrate facing the opposite substrate, so the layer structures 21 can be formed of these layers in the array substrate to lower the difficulty of fabricating the display panel.

Optionally, in some embodiments of the disclosure, the layer structures 21 can be formed of any one or more of the layers in the array substrate as long as the formed layer structures 21 can support the support structures 22 to improve the visual uniformity of the opening area K, and thus the display effect of the display panel, although the embodiment of the disclosure will not be limited thereto.

It shall be noted that in the embodiment of the disclosure, the opening area K of the display panel can be cave away, that is, a through-hole running through the display panel is arranged in the opening area K, or positions, on the first substrate 01 and the second substrate 02, corresponding to the opening area K are reserved, that is, no openings are arranged on the first substrate 01 and the second substrate 02, but no layer structures are arranged at the positions, on the surfaces of the first substrate 01 and the second substrate 02, corresponding to the opening area K, or layers with a high transmittivity are reserved at the positions on the surfaces of the first substrate 01 and the second substrate 02, corresponding to the opening area K, so that there is a high transmittivity of the opening area K to arrange a functional element (e.g., a camera, etc.) for performing a general function of the function element.

Figure 14:
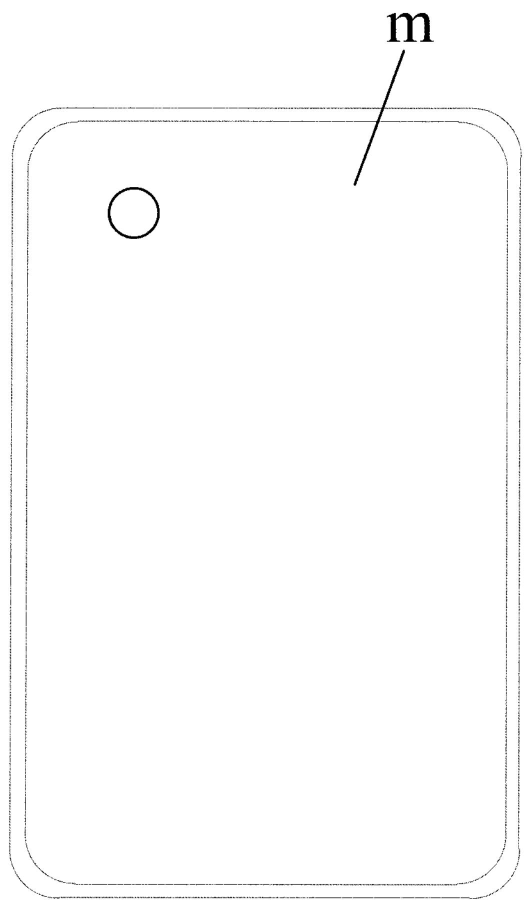
FIG. 14 is a schematic structural diagram of a display device according to some embodiments of the disclosure.

Based upon the same inventive idea, some embodiments of the disclosure provide a display device as illustrated in FIG. 14 which is a schematic structural diagram of the display device, where the display device includes the display panel m above according to the embodiment of the disclosure.

In a particular implementation, the display device can be a mobile phone (as illustrated in FIG. 14), a tablet computer, a TV set, a monitor, a notebook computer, a digital photo frame, a navigator, or any other product or component with a display function. Reference can be made to the embodiment of the display panel above for an implementation of the display device, so a repeated description thereof will be omitted here. Reference can be made to the embodiment of the display panel above for an implementation of the display device, so a repeated description thereof will be omitted here.

In the display panel and the display device according to embodiments of the disclosure, the opening support structures are arranged between the first substrate and the second substrate in at least the sub-area corresponding to the largest one of the respective first spacings, that is, the opening support structures are arranged in at least the sub-area in which the connection segments of the touch signal lines are the most sparsely arranged, so that the opening area can visually appear in shape more approximate to the real shape of the opening area to improve the visual uniformity of the opening area to improve the display effect of the display panel.

What is claimed is:

1. A display panel, comprising:

an opening area, a traveling line area surrounding the opening area, and a display area surrounding the traveling line area, wherein:

the display panel comprises a first substrate and a second substrate, a plurality of touch signal lines are arranged in a first direction on a side of the first substrate facing the second substrate, and at least a part of the touch signal lines comprise connection segments located in the traveling line area; and the display panel comprises opening support structures located between the first substrate and the second substrate, and the opening support structures are at least located in a sub-area corresponding to a largest one of first spacings, wherein the traveling line area comprises a plurality of sub-areas, and each of the first spacings is a largest one of spacings between every two adjacent connection segments in a sub-area in the first direction, and different first spacings correspond to different sub-areas.

2. The display panel according to claim 1, wherein orthographic projections of the opening support structures onto the second substrate do not overlap with orthographic projections of the connection segments onto the second substrate.

3. The display panel according to claim 1, comprising a plurality of opening support structures arranged in at least a part of the sub-areas; and areas of orthographic projections of the opening support structures onto the second substrate are same, and distribution densities of the opening support structures are positively correlated to the first spacings corresponding to the sub-areas where the opening support structures are located; or areas of orthographic projections of the opening support structures onto the second substrate are positively correlated to the first spacings corresponding to the sub-areas where the opening support structures are located.

4. The display panel according to claim 1, comprising a plurality of opening support structures, and areas of orthographic projections of the opening support structures onto the second substrate are same; and at least a part of the sub-areas are connected with the opening area, the sub-areas connected with the opening area are connected with each other to constitute a closed area, and the opening support structures located in the closed area are distributed uniformly at an edge of the opening area.

5. The display panel according to claim 4, wherein the opening support structures are connected with each other to constitute an annular structure surrounding the opening area.

6. The display panel according to claim 1, wherein each of the opening support structure comprises a layer structure and a support structure arranged in a stack, and an orthographic projection of the support structure onto the second substrate at least partially overlaps with an orthographic projection of the layer structure onto the second substrate.

7. The display panel according to claim 6, wherein the orthographic projection of the support structure onto the second substrate falls into the orthographic projection of the layer structure onto the second substrate.

8. The display panel according to claim 6, comprising an array substrate and an opposite substrate opposite to each other, and the first substrate is an underlying substrate in the array substrate, and the second substrate is an underlying substrate in the opposite substrate; or the second substrate is an underlying substrate in the array substrate, and the first substrate is an underlying substrate in the opposite substrate; and the support structures are arranged between the array substrate and the opposite substrate, and the layer structures are located in the array substrate or the opposite substrate.

9. The display panel according to claim 8, further comprising spacers located between the array substrate and the opposite substrate; and a shape and material of the support structures are identical to those of the spacers.

10. The display panel according to claim 8, wherein the layer structures are located in the opposite substrate; and the opposite substrate comprises color-resist blocks arranged on a side thereof facing the array substrate, and the layer structures are arranged at a layer same as a layer where the color-resist blocks are arranged.

11. The display panel according to claim 10, wherein the color-resist blocks comprise red color-resist blocks, blue color-resist blocks, and green color-resist blocks; and the layer structures are made of a material same as at least one of the red color-resist blocks, the blue color-resist blocks, or the green color-resist blocks.

12. The display panel according to claim 11, wherein the layer structures are of a size same as that of the color-resist blocks.

13. The display panel according to claim 11, wherein the layer structures are an annular structure surrounding the opening area.

14. A display device, comprising:

a display panel, comprising:

an opening area, a traveling line area surrounding the opening area, and a display area surrounding the traveling line area, wherein:

the display panel comprises a first substrate and a second substrate, a plurality of touch signal lines are arranged in a first direction on a side of the first substrate facing the second substrate, and at least a part of the touch signal lines comprise connection segments located in the traveling line area; and the display panel comprises opening support structures located between the first substrate and the second substrate, and the opening support structures are at least located in a sub-area corresponding to a largest one of first spacings, wherein the traveling line area comprises a plurality of sub-areas, and the largest one of the first spacing is a largest one of spacings between every two adjacent connection segments in a sub-area in the first direction, and different first spacing correspond to different sub-areas.

15. The display device according to claim 14, wherein orthographic projections of the opening support structures onto the second substrate do not overlap with orthographic projections of the connection segments onto the second substrate.

16. The display device according to claim 14, wherein the display panel further comprises a plurality of opening support structures arranged in at least a part of the sub-areas; and areas of orthographic projections of the opening support structures onto the second substrate are same, and distribution densities of the opening support structures are positively correlated to the first spacings corresponding to the sub-areas where the opening support structures are located; or areas of orthographic projections of the opening support structures onto the second substrate are positively correlated to the first spacings corresponding to the sub-areas where the opening support structures are located.

17. The display device according to claim 14, wherein the display panel further comprises a plurality of opening support structures, and areas of orthographic projections of the opening support structures onto the second substrate are same; and at least a part of the sub-areas are connected with the opening area, the sub-areas connected with the opening area are connected with each other to constitute a closed area, and the opening support structures located in the closed area are distributed uniformly at an edge of the opening area.

18. The display device according to claim 17, wherein the opening support structures are connected with each other to constitute an annular structure surrounding the opening area.

19. The display device according to claim 14, wherein each of the opening support structure comprises a layer structure and a support structure arranged in a stack, and an orthographic projection of the support structure onto the second substrate at least partially overlaps with an orthographic projection of the layer structure onto the second substrate.

20. The display device according to claim 19, wherein the orthographic projection of the support structure onto the second substrate falls into the orthographic projection of the layer structure onto the second substrate.

* * * * *